United States Patent
Murali et al.

(10) Patent No.: US 12,158,797 B2
(45) Date of Patent: Dec. 3, 2024

(54) INTELLIGENT DYNAMIC CONDITION-BASED INFRASTRUCTURE MAINTENANCE SCHEDULING

(71) Applicant: INTERNATIONAL BUSINESS MACHINES CORPORATION, Armonk, NY (US)

(72) Inventors: Pavankumar Murali, Ardsley, NY (US); Dzung Tien Phan, Pleasantville, NY (US); Nianjun Zhou, Chappaqua, NY (US); Lam Minh Nguyen, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/949,731

(22) Filed: Sep. 21, 2022

(65) Prior Publication Data
US 2024/0103959 A1     Mar. 28, 2024

(51) Int. Cl.
*G06F 11/07* (2006.01)
*G06F 11/00* (2006.01)

(52) U.S. Cl.
CPC ........ *G06F 11/0793* (2013.01); *G06F 11/008* (2013.01)

(58) Field of Classification Search
CPC ............................ G06F 11/0793; G06F 11/008
USPC ............................................................ 714/1
See application file for complete search history.

(56) References Cited

U.S. PATENT DOCUMENTS

| | | | |
|---|---|---|---|
| 9,058,568 B2 | 6/2015 | Hosking et al. | |
| 9,959,514 B2 | 5/2018 | Phan et al. | |
| 9,959,515 B2 | 5/2018 | Phan et al. | |
| 2006/0129367 A1 | 6/2006 | Mishra et al. | |
| 2014/0324495 A1 | 10/2014 | Zhou et al. | |
| 2016/0314405 A1 | 10/2016 | Bihannic et al. | |
| 2020/0265331 A1* | 8/2020 | Tashman | G06N 7/01 |
| 2021/0048807 A1 | 2/2021 | Zhou et al. | |
| 2022/0108262 A1* | 4/2022 | Cella | G06Q 10/063118 |

FOREIGN PATENT DOCUMENTS

WO     2020068110     4/2020

OTHER PUBLICATIONS

Wikipedia "computer modeling" page, retrieved from https://en.wikipedia.org/wiki/Computer_simulation (Year: 2020).*

(Continued)

*Primary Examiner* — Yair Leibovich
(74) *Attorney, Agent, or Firm* — Nicholas Welling; Andrew D. Wright; Calderon Safran & Wright P.C.

(57) ABSTRACT

In example aspects of this disclosure, a method includes generating, by one or more computing devices, a parametric model that expresses condition states for each of a plurality of assets, and the probability of the assets transitioning between the condition states; generating, by the one or more computing devices, stochastic degradation predictions of a group of the assets, based on the condition states and the probability of transitioning between the condition states for at least some of the assets; and generating, by the one or more computing devices, a maintenance schedule based on: the stochastic degradation predictions of the group of the assets, costs of corrective maintenance for assets in a failed state, and costs of scheduled maintenance for the assets.

20 Claims, 7 Drawing Sheets

(56) References Cited

OTHER PUBLICATIONS

Black et al., "A semi-Markov approach for modelling asset deterioration", Journal of the Operational Research Society, vol. 56, Issue 11, 2005, 9 pages.
Xu et al., "Condition-based midterm maintenance scheduling with rescheduling strategy", International Journal of Electrical Power & Energy Systems, vol. 118, 105796, 2020, 10 pages.
Yildirim et al. "Integrated Predictive Analytics & Optimization for Opportunistic Maintenance and Operations in Wind Farms", IEEE Transactions on Power Systems, vol. 32 (6), 2017, 10 pages.
Yildirim et al., "Sensor-Driven Condition-Based Generator Maintenance Scheduling—Part 1: Maintenance Problem", IEEE Transactions on Power Systems, vol. 31 (6), 2016, 11 pages.
Chan et al., Optimum maintenance policy with Markov processes, Electric Power Systems Research, vol. 76, 2006, 5 pages.
You Liang, "Risk Management by Markov Decision Processes", A thesis submitted to the Faculty of Graduate Studies of The University of Manitoba in partial fulfillment of the requirements for the degree of Doctor of Philosophy, Department of Statistics, The Univeristy of Manitoba, Winnepeg, Canada, 2015, 137 pages.
Grace Period Disclosure, Murali et al., "Asset Health Condition-based Maintenance Scheduling", INFORMS Annual Meeting, Oct. 24, 2021, 15 pages.
Ye et al., "Modeling for Reliability Optimization of System Design and Maintenance based on Markov Chain Theory," Computers & Chemical Engineering 124, 2019, 49 pages.
Sarje, "Maintenance of the System by Using Markov-Chain Analysis and Predictive Preventive Maintenance Policy", JETIR (Journal of Emerging Technologies and Innovative Research), vol. 6, No. 3, Mar. 2019, 7 pages.
Eltahir et al., "Continuous-Time Markov Chain Model of Repairable Machine: Application to Asalaya Sugar Factory", IOSR Journal of Mathematics (IOSR-JM), vol. 17, No. 3 Ser. II, May-Jun. 2021, 9 pages.
Zhang et al., "Imperfect Maintenance Optimization of Multi-State Rolling Stocks Based on Deep Reinforcement Learning", 2021 3rd Intern. Conference on System Reliability and Safety Engin. (SRSE), 2021, 5 pages.
Senthil et al., "Proactive Maintenance Model Using Reinforcement Learning Algorithm in Rubber Industry", Processes, vol. 10, No. 2, 371, 2022, 18 pages.
Bondavalli et al., "Dependability Modelling and Sensitivity Analysis of Scheduled Maintenance Systems", European Dependable Computing Conference, CNUCE/CNR, Pisa, Italy, 1999, 17 pages.
Murali et al., "Asset Health Condition-based Maintenance Scheduling", INFORMS Annual Meeting, Oct. 24, 2021, 15 pages.

* cited by examiner

INTELLIGENT DYNAMIC CONDITION-BASED INFRASTRUCTURE MAINTENANCE SCHEDULING

BACKGROUND

Aspects of the present invention relate generally to scheduling maintenance for assets and, more particularly, to intelligent, dynamic, automated maintenance scheduling for distributed infrastructure assets.

Fixed infrastructure, such as in an electricity generation and distribution utility grid, tend to comprise large numbers of geographically distributed fixed assets, such as power generation plants and their components, transmission lines and their components, and relay stations.

STATEMENT REGARDING PRIOR DISCLOSURES BY THE INVENTOR OR A JOINT INVENTOR

The following disclosure(s) are submitted under 35 U.S.C. 102(b)(1)(A):
DISCLOSURE: "Asset Health Condition-based Maintenance Scheduling," Murali et al. (i.e. the identical inventors of the present disclosure), presented on Oct. 24, 2021 at the INFORMS conference at Anaheim, California, 15 pages; listed in and provided with IDS.

SUMMARY

In a first aspect of the invention, there is a computer-implemented method including: generating, by one or more computing devices, a parametric model that expresses condition states for each of a plurality of assets, and the probability of the assets transitioning between the condition states; generating, by the one or more computing devices, stochastic degradation predictions of a group of the assets, based on the condition states and the probability of transitioning between the condition states for at least some of the assets; and generating, by the one or more computing devices, a maintenance schedule based on: the stochastic degradation predictions of the group of the assets, costs of corrective maintenance for assets in a failed state, and costs of scheduled maintenance for the assets.

In another aspect of the invention, there is a computer program product including one or more computer readable storage media having program instructions collectively stored on the one or more computer readable storage media. The program instructions are executable to: generate a parametric model that expresses condition states for each of a plurality of assets, and the probability of the assets transitioning between the condition states; generate stochastic degradation predictions of a group of the assets, based on the condition states and the probability of transitioning between the condition states for at least some of the assets for at least some of the assets; and generate a maintenance schedule based on: the stochastic degradation predictions of the group of the assets, costs of corrective maintenance for assets in a failed state, and costs of scheduled maintenance for the assets.

In another aspect of the invention, there is system including a processor, a computer readable memory, one or more computer readable storage media, and program instructions collectively stored on the one or more computer readable storage media. The program instructions are executable to: generate a parametric model that expresses condition states for each of a plurality of assets, and the probability of the assets transitioning between the condition states; generate stochastic degradation predictions of a group of the assets, based on the condition states and the probability of transitioning between the condition states for at least some of the assets for at least some of the assets; and generate a maintenance schedule based on: the stochastic degradation predictions of the group of the assets, costs of corrective maintenance for assets in a failed state, and costs of scheduled maintenance for the assets.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
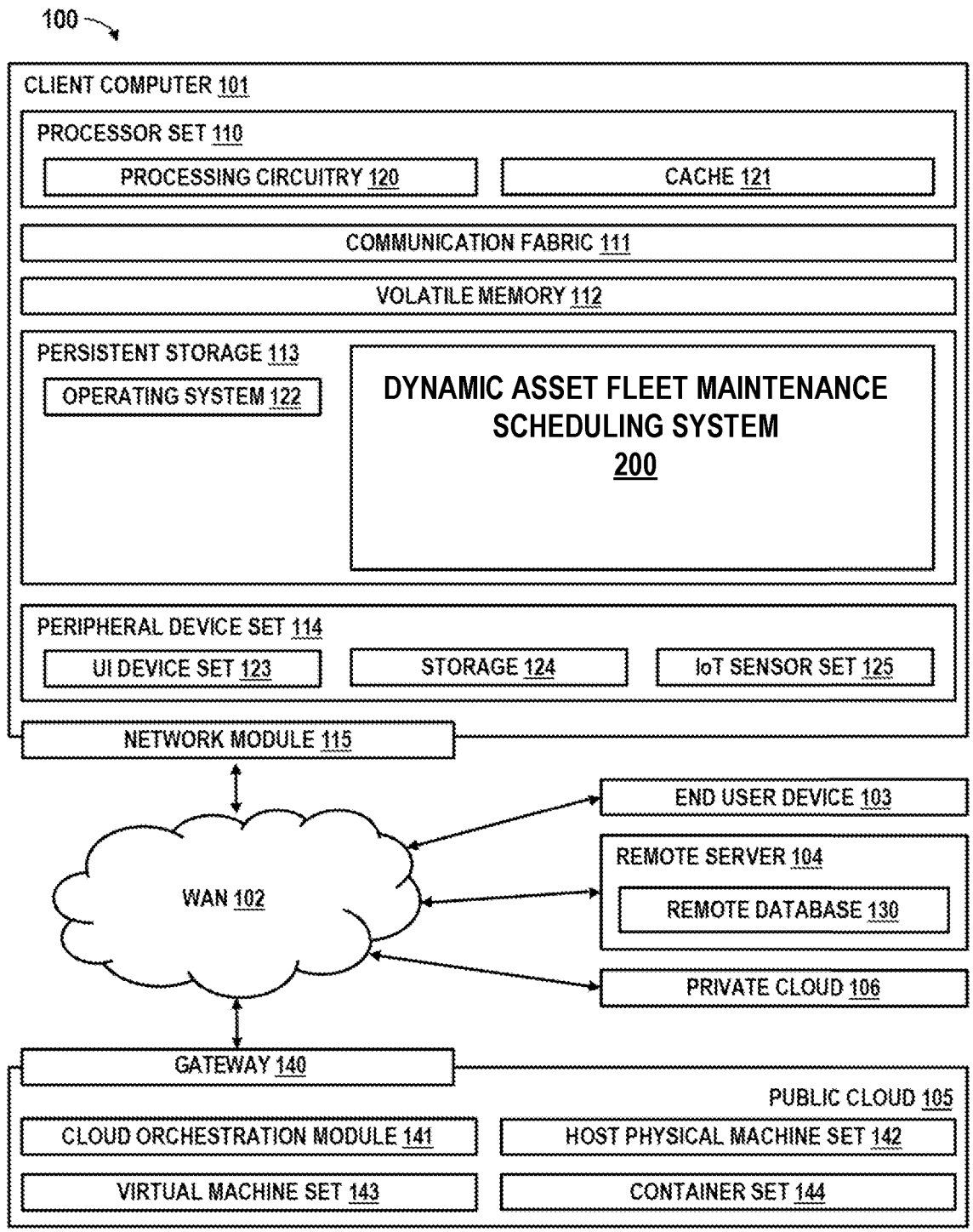
FIG. 1 depicts a computing environment according to an embodiment of the present invention.

Aspects of the present invention relate generally to managing maintenance for infrastructure assets, and, more particularly, to optimized automated maintenance scheduling for distributed fixed infrastructure assets, such as in an electrical power grid, a natural gas distribution grid, a municipal water supply system, or any other distributed infrastructure. As noted, fixed infrastructure tends to comprise large numbers of geographically distributed fixed assets. Keeping all of these assets maintained over decades of service is highly important and requires substantial resources and efficiency. Maintenance scheduling for distributed fixed assets in an infrastructure system is a complex and important challenge. According to various aspects of the invention, one or more computing devices generate a parametric model that expresses condition states for each of a plurality of assets, and the probability of the assets transitioning between the condition states, wherein the parametric model is based at least in part on historical asset health data, and wherein the condition states comprise at least a new or "recently maintained" state, an operational state, a critical or "soon-to-fail" state, a failed state, and an under-maintenance state. In various embodiments, one or more computing devices generate a stochastic degradation prediction of a group state of the plurality of assets based at least in part on the condition states for at least some of the assets. In various embodiments, one or more computing devices generate a maintenance schedule based at least in part on: the stochastic degradation prediction of the group state of the plurality of assets, costs of corrective maintenance for assets in the failed state, and costs of scheduled maintenance for the assets. In this manner, implementations of the invention optimize the scheduling of maintenance of varied assets in a complex distributed infrastructure, in an intelligent dynamic optimization among many competing requirements and factors, thereby optimizing system performance and efficiency, and maintenance costs.

Systems of this disclosure may thus perform highly technical optimizations for scheduling maintenance among large numbers of various kinds of assets in a distributed infrastructure across long periods of time, with the optimization employing sophisticated mathematical calculations taking into account a rich variety of factors and a large basis of data, which may include both historical data, and incoming realtime data from distributed sensors and data sources comprised in and/or in association with distributed assets of the infrastructure. Such methods and techniques are thus far beyond what would be possible to perform merely mentally, and have a number of characteristics that are uniquely susceptible to implementation by one or more computing devices and/or a computing system. Such methods, techniques, devices, and systems of this disclosure may also enable unique inventive advantages, illustratively such as optimizing performance and consistent up-time of a sophisticated infrastructure, with optimized efficiency and costs, in ways beyond what would be possible with prior art systems.

Various inventive advantages of the present disclosure may be appreciated more fully in contrast to conventional systems. Example conventional systems rely on static maintenance scheduling. Static maintenance scheduling is based on certain assumptions, such as asset failure risk scores that are predetermined at the start of a planning process and are time-invariant during a maintenance scheduling execution phase. As a corollary to the above assumption, it is assumed that assets do not fail and their health does not degrade prior to their scheduled maintenance. Once maintenance has been completed, an asset does not fail until the end of the planning horizon. Asset downtime and maintenance costs are treated as deterministic.

Optimization models for static scheduling in example conventional systems are typically deterministic, multi-period, one-shot models that minimize maintenance costs, impact of disruption, time to complete maintenance of an asset fleet, etc. Since the execution of a maintenance plan from static models assumes no change in asset health, the models incorporate a sub-optimal risk of unexpected failures. In such events of unexpected failures, or when the health of an asset has severely degraded, the assumed state of the conventional optimization model is no longer valid, and the optimization model needs to be rerun.

Rerunning a conventional system scheduling model may result in major changes to the maintenance plan in later time periods, rebalancing of assets to be maintained to minimize disruption (demand to meet in an electricity distribution network), and various other disruptions of up to arbitrarily large new margins of unexpected costs, schedule changes, and inefficiencies. Shortcomings such as these may make rescheduling using conventional static models expensive and time-intensive.

In electricity utility examples, much of the market clearing processes (day-ahead, intra-day, real-time etc.) that balance supply and demand and determine electricity price assume a certain number of assets available within the network. Conventional static models are not capable of being integrated with dynamic load curves or energy prices determined by one of these clearing processes.

Intelligent, dynamic asset fleet maintenance scheduling systems of this disclosure may resolve all of these shortcomings, among other inventive advantages, aspects of which are evident from the description that follows and the accompanying figures. Systems of this disclosure may incorporate uncertainties and probability distributions of asset failures as parts of prediction models, and may incorporate and update models intelligently based on ongoing data acquisition and asset condition updates, rather than having models that become broken by unpredicted failures and need to be re-run and replaced. Systems of this disclosure may dynamically and gracefully evolve its models based on new data over time, and avoid unexpected discontinuities and disruptions in maintenance scheduling, in various examples, among other inventive advantages as apparent from the description herein.

It should be understood that implementations of the invention are not expected or intended to collect, store, or employ personal information provided by, or obtained from, individuals. In the occurrence of any exceptions to that, such information shall be used in accordance with all applicable laws concerning protection of personal information. In case of any unforeseen exception, the collection, storage, and use of any such information may be subject to consent of the individual to such activity, for example, through "opt-in" or "opt-out" processes as may be appropriate for the situation and type of information. Storage and use of any personal information, if there were any extent applicable, may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as dynamic asset fleet maintenance scheduling system 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
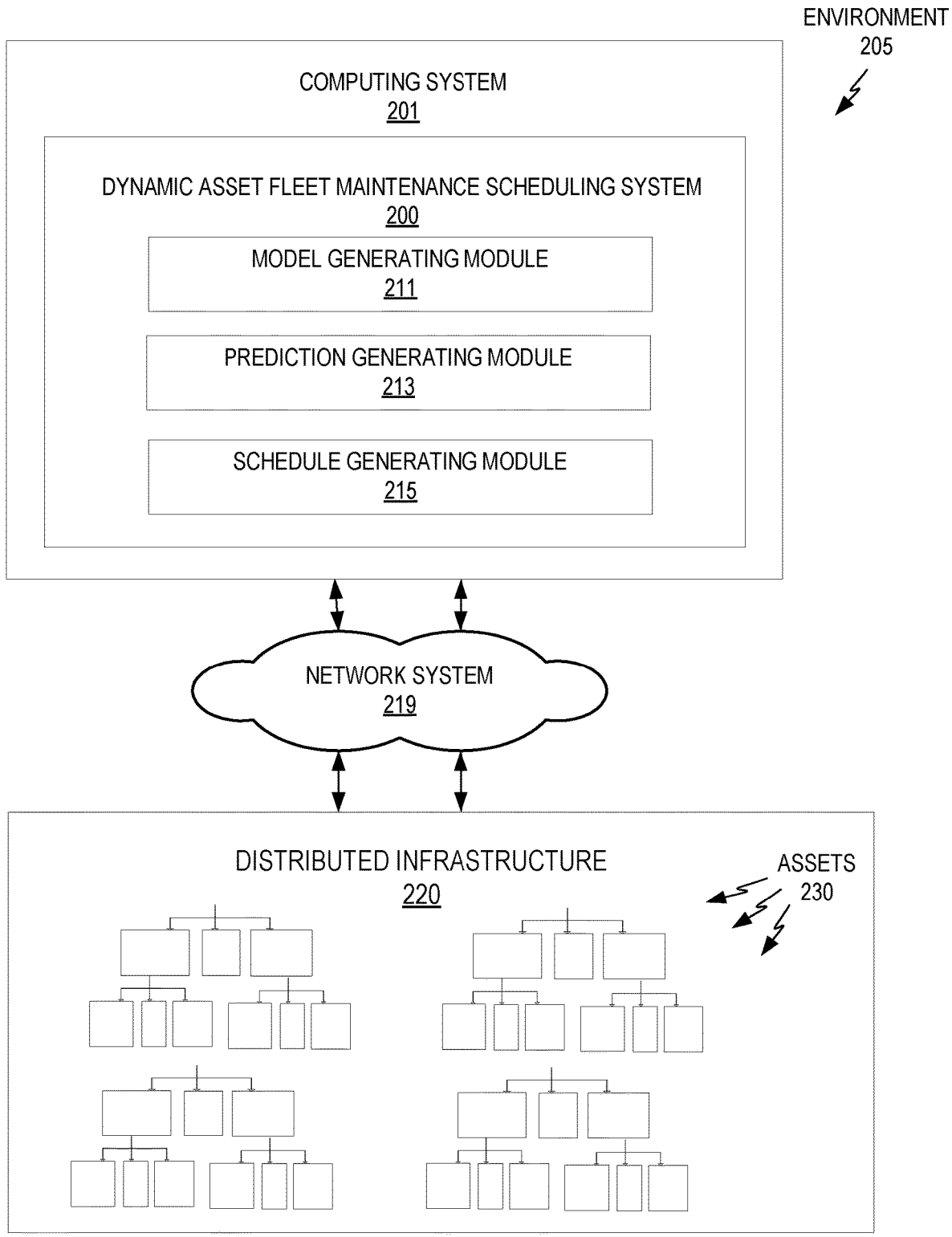
FIG. 2 shows a block diagram of an exemplary environment in accordance with aspects of the invention.

FIG. 2 shows a conceptual block diagram of an exemplary environment 205 in accordance with aspects of the invention. In various embodiments, environment 205 includes distributed infrastructure 220 and computing system 201. Distributed infrastructure 220 comprises a plurality of distributed assets 230, which may be any of a variety of kinds of assets. Computing system 201 comprises, implements, and/or embodies dynamic asset fleet maintenance scheduling system 200, which communicates with assets 230 of distributed infrastructure 220 via a network system 219. Dynamic asset fleet maintenance scheduling system 200 comprises model generating module 211, prediction generating module 213, and schedule generating module 215, in various examples.

Computing system 201 may include any one or more computing devices, in any kind of networking arrangement, in various examples. Dynamic asset fleet maintenance scheduling system 200 shown in FIG. 2 may comprise, be comprised in, or comprise components or aspects that may be comprised in, computing environment 100 and client computer 101 of FIG. 1, in various embodiments. For example, dynamic asset fleet maintenance scheduling system 200 may comprise and/or be comprised in, and/or embodied and/or implemented by, any one or more servers, user devices, computing devices, processing devices, or any kinds of devices (which may be collectively referred to for present purposes as "computing devices") illustratively including client computer 101 of FIG. 1, and which may operably connect with one or more cloud computing environments or services and/or other networking and/or communication systems or services (e.g., WAN 102 of FIG. 1).

Environment 205 may also comprise computing devices, networking devices, and other devices and resources, all or some of which may be comprised in network system 219, which may be operably connected with or may at times operably connect with computing system 201. Devices or elements comprised in network system 219 may also correspond with analogous elements or aspects shown in FIG. 1, such as WAN 102 and the devices connected thereto. Devices or elements comprised in network system 219 may participate in carrying out inventive steps among aspects of distributed infrastructure 220 and/or communicating inventive functions or aspects from computing system 201 to elements of distributed infrastructure 220. Computing system 201 and/or other computing devices distributed among and/or comprised in distributed infrastructure 220 may comprise one or more servers that perform inventive steps described with reference to FIG. 2 and that may correspond to computer 101 of FIG. 1. Code comprised in and/or running on one or more servers comprised in computing system 201 and/or elsewhere in distributed infrastructure 220 of FIG. 2 (including program modules in the code) may correspond to code of dynamic asset fleet maintenance scheduling system 200 as also shown in FIG. 1. Computing system 201 and/or other computing devices distributed among and/or comprised in distributed infrastructure 220 may comprise one or more user devices, network systems or devices, and/or remote databases or other data stores, that may correspond respectively to EUD 103 of FIG. 1, WAN 102 of FIG. 1, and remote server 104 and/or remote database 130 of FIG. 1, in various aspects.

In various embodiments, computing system 201 comprises model generating module 211, prediction generating module 213, and schedule generating module 215, each of which may comprise modules of code of dynamic asset fleet maintenance scheduling system 200 of FIG. 1. These modules of code of dynamic asset fleet maintenance scheduling system 200 are executable by the processing circuitry 120 of FIG. 1 to perform the inventive methods as described herein. Computing system 201 may include additional or fewer modules than those shown in FIG. 2. In various embodiments, separate modules may be integrated into a single module. Additionally, or alternatively, a single module may be implemented as multiple modules. In various implementations, any function, any code, and any portion of a method described herein may be embodied in any arrangement in computing system 201, dynamic asset fleet maintenance scheduling system 200, and/or environment 205. Moreover, the quantity of devices and/or networks in the environment is not limited to what is shown in FIG. 2. In practice, environment 205 may include additional devices and/or networks; fewer devices and/or networks; different devices and/or networks; or differently arranged devices and/or networks than illustrated in FIG. 2.

Model generating module 211, prediction generating module 213, and schedule generating module 215 may each comprise any arrangement of software code, data, libraries, or any other software resources, and are not limited by any particular definition of the term "module" in any specific field of software programming or engineering. Any of the functions of any of model generating module 211, prediction generating module 213, and schedule generating module 215 may be performed and/or embodied by, and attributed to, any one or more computing devices in computing system 201.

Model generating module 211 may generate a parametric model that expresses condition states for each of a plurality of assets, and the probability of the assets transitioning between the condition states, as further described below, including with reference to FIG. 2 and the following figures. The parametric model is based at least in part on historical asset health data. The possible condition states for each asset comprise at least: a new or "recently maintained" state, in which the asset has just begun operating after a maintenance operation has been completed; an operational state, in which the asset is operating nominally; a critical or "soon-to-fail" state, in which an the asset performance parameters may be showing performance degradation and not performing maintenance could lead to failure; a failed state, in which the asset has entered a state of failing to operate nominally; and an under-maintenance state, in which the asset has been removed from nominal service to undergo a maintenance process. Predicting the probability of the assets transitioning between the condition states may thus comprise making predictions of when an asset in the operational state may fail, and transition to the failed state, for example. Prediction generating module 213 may generate a stochastic degradation prediction of a group state of the plurality of assets, e.g., a single total state collectively describing the individual condition states of the individual assets, based at least in part on the condition states for at least some of the assets, as further described below with reference to the following figures. Schedule generating module 215 may generate a maintenance schedule based at least in part on: the stochastic degradation prediction of the group state of the plurality of assets, generated by prediction generating module 213; costs of corrective maintenance for assets in the failed state; and costs of scheduled maintenance for the assets, as further described below with reference to the following figures. These and various functions of model generating module 211, prediction generating module 213, and schedule generating module 215 are further described below, in accordance with various examples.

Infrastructure 220 comprises a plurality of distributed assets 230, which may include a large number of assets of various kinds, and may feature complex interconnections among the assets 230. The depiction in FIG. 2 of infrastructure 220 is not intended to depict particular specifics of such assets or interconnections, and the assets comprised in infrastructure 220 are not individually described, nor is their depiction intended to demonstrate any particular components or functions. In an illustrative electrical power grid example, infrastructure 220 may comprise a plurality of electrical power generation plants of any of various energy sources and technologies, electrical substations, a plurality of power cables and towers and electricity distribution lines and nodes, a plurality of monitoring facilities, computing facilities, storage facilities, office buildings, warehouses, garages, vehicles, and so forth, and various other assets of any type that may be necessary and/or conducive to successful operation and delivery of electrical power for an operating region or entity of any arbitrary scale. Further examples below are discussed in terms of inventive implementations of this disclosure focused on dynamic assessment and management of an electrical power utility example of a distributed infrastructure, with the understanding that the disclosure and claims are not limited to these examples, and analogous systems and features applicable to any other type of infrastructure are to be found in other examples.

Figure 3:
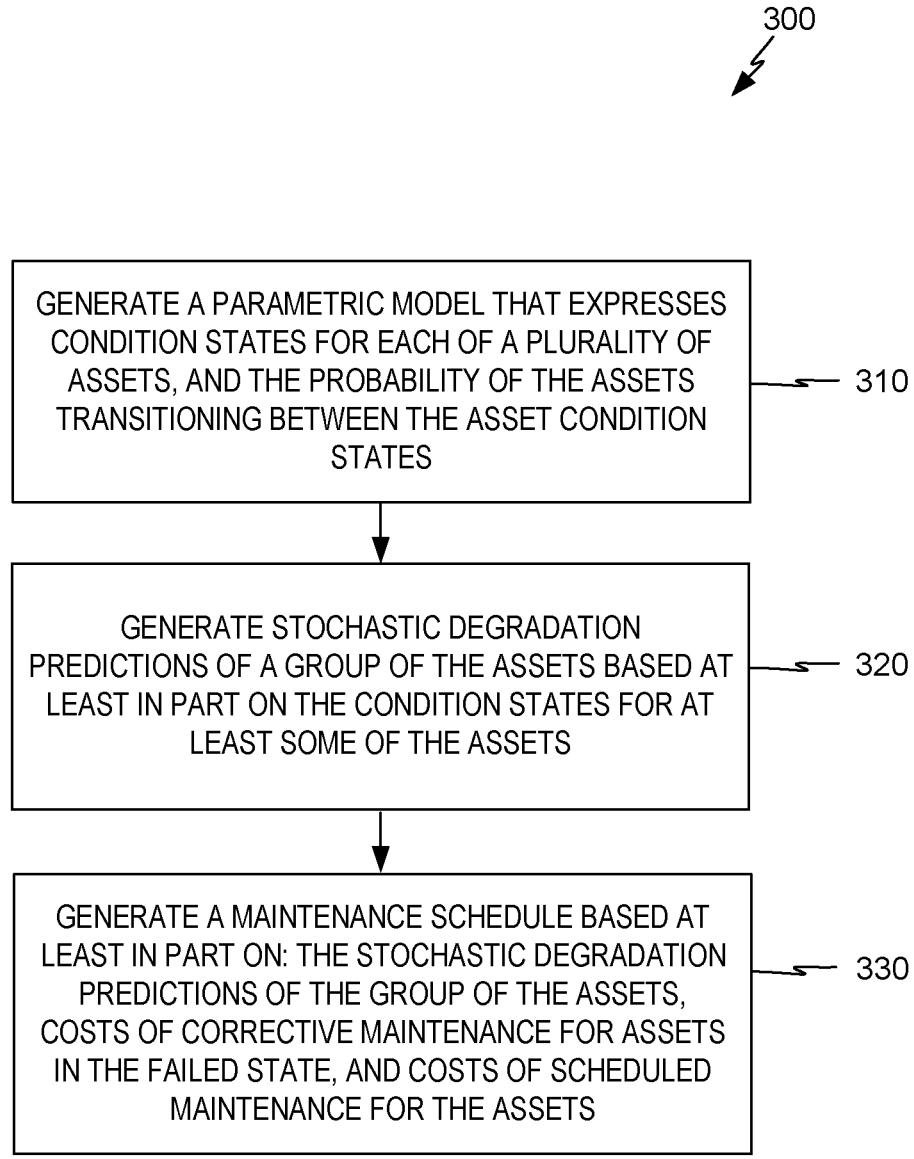
FIG. 3 shows a flowchart of an exemplary method in accordance with aspects of the invention.

FIG. 3 shows a flowchart of an exemplary method 300 in accordance with aspects of the present invention. Steps of the method may be carried out by dynamic asset fleet maintenance scheduling system 200 implemented in computing system 201 of FIG. 2, in environment 205 of FIG. 2, and are described with reference to elements depicted in FIG. 2.

In various embodiments, and as described with respect to FIG. 2, dynamic asset fleet maintenance scheduling system 200 (e.g., model generating module 211) generates a parametric model that expresses condition states for each of a plurality of assets, and the probability of the assets transitioning between the condition states (310). The parametric model may be based at least in part on historical asset health data, and the condition states may comprise at least a new state, an operational state, a soon-to-fail state, a failed state, and an under-maintenance state. Dynamic asset fleet maintenance scheduling system 200 (e.g., prediction generating module 213) generates stochastic degradation predictions of a group of the assets based at least in part on the condition states for at least some of the assets (320). Dynamic asset fleet maintenance scheduling system 200 (e.g., schedule generating module 215) generates a maintenance schedule based at least in part on: the stochastic degradation predictions of the group of the assets, costs of corrective maintenance for assets in the failed state, and costs of scheduled maintenance for the assets (330). Various aspects are further discussed below. Dynamic asset fleet maintenance scheduling system 200 may perform further steps and functions in various embodiments.

Figure 4:
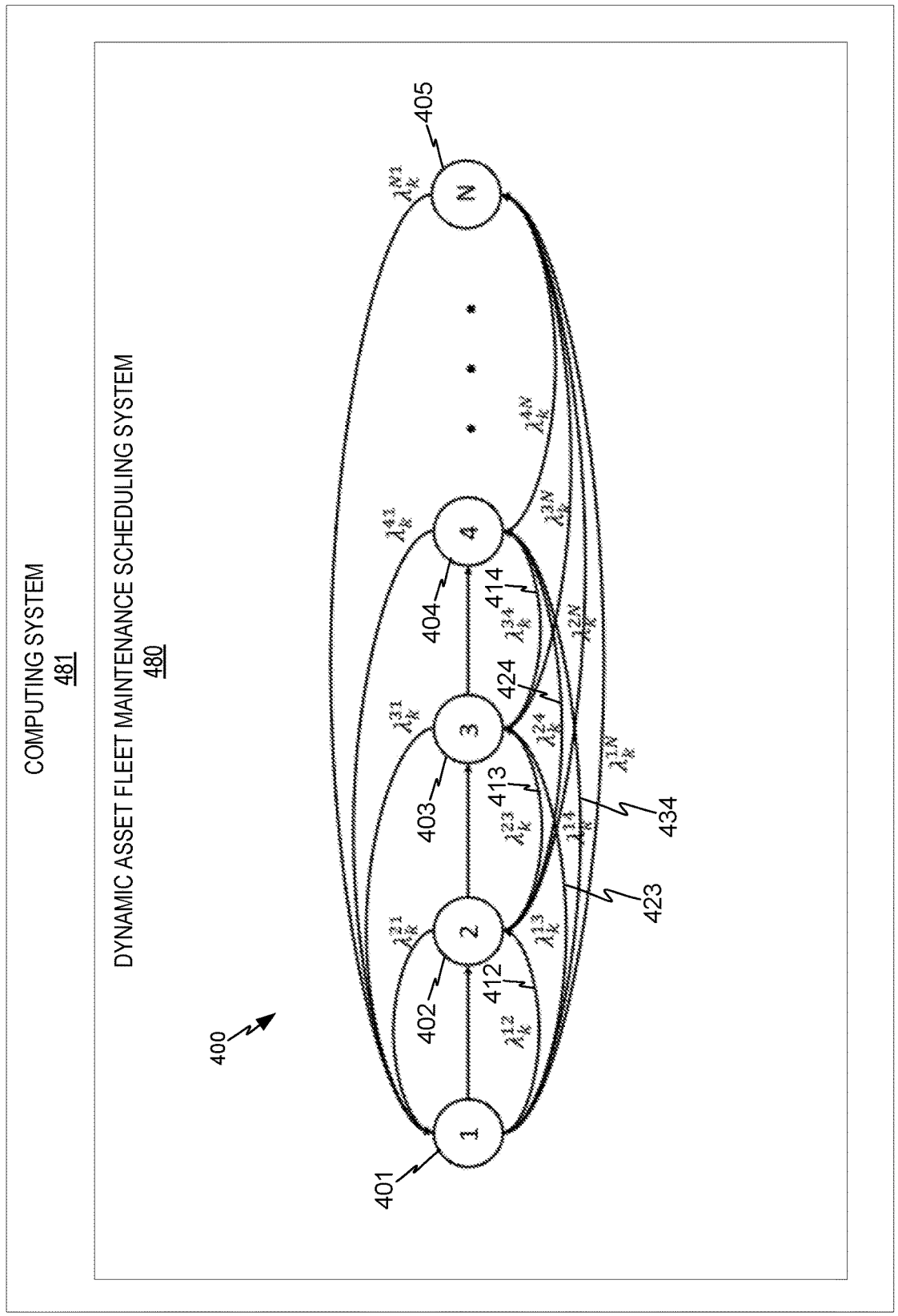
FIG. 4 depicts a conceptual condition state transition diagram that conceptually illustrates condition state parametric modeling that dynamic asset fleet maintenance scheduling system may perform, in accordance with various examples of this disclosure.

FIG. 4 depicts a condition state transition model 400 that dynamic asset fleet maintenance scheduling system 480 mathematically models in software, and conceptually illustrates, condition state parametric modeling that dynamic asset fleet maintenance scheduling system 480 may perform, in accordance with various examples of this disclosure. Dynamic asset fleet maintenance scheduling system 480 may be either identical or a different example of this disclosure as dynamic asset fleet maintenance scheduling system 200 described herein, and may be implemented in computing system 481, in various examples. Any or all description attributed to dynamic asset fleet maintenance scheduling system 480 may also apply to dynamic asset fleet maintenance scheduling system 200, and vice versa, in various examples. Dynamic asset fleet maintenance scheduling system 480 may perform dynamic maintenance scheduling based on a parametric model to characterize the stochastic degradation process of an asset between different condition states. Dynamic asset fleet maintenance scheduling system 480 may model this parametric model stochastic degradation process of an asset as a continuous time Markov chain (CTMC) with time homogeneity, in some examples. Dynamic asset fleet maintenance scheduling system 480 may also implement other stochastic modeling mathematical frameworks and other modeling techniques in other examples. In the CTMC with time homogeneity framework, dynamic asset fleet maintenance scheduling system 480 may use condition state transition model 400 with computed transition probabilities, including for stochastic degradation transitions. Dynamic asset fleet maintenance scheduling system 480 may determine states that correspond to asset health states from "new" (1) to "failed" (N) (e.g., operational, under-maintenance, and failed states) using a combination of data analysis, and one or more inputs from one or more subject matter experts. Using data-derived transition probabilities, dynamic asset fleet maintenance scheduling system 480 may implement methods to compute transition rates between states (1, 2, 3, . . . N) in condition state transition model 400. Additionally, dynamic asset fleet maintenance scheduling system 480 may determine a critical state, or critical health threshold state, for each asset (of one or more assets), and the expected time (e.g., based on historical data of the asset, of the asset's conditions over time, of analogous assets and their conditions over time) for the particular asset to degrade from a new state to the critical health threshold state ("critical state").

The nodes 1, 2, . . . N of condition state transition model 400 may, in some examples, correspond to a new or "recently maintained" state 401, in which the asset being modeled has just begun operating after a maintenance operation has been completed; an operational state 402, in which the asset is operating nominally, after being in the new or recently maintained state 401; a critical or "soon-to-fail" state 403, in which an the asset performance parameters may be showing performance degradation and not performing maintenance could lead to failure; a failed state 404, in which the asset has entered a state of failing to operate nominally; and an under-maintenance state 405.

Condition state transition model 400 further includes modeling representations of the transitions between these states, with the "downward" transitions corresponding to predicted stochastic degradation transitions (with the understanding that the patent reference numbers are side-by-side with the mathematical representations of the stochastic degradation transitions, each designated with a lambda with appropriate subscripts and superscripts). These include stochastic degradation transition 412 from new or recently maintained state 401 to nominal state 402, stochastic degradation transition 413 from nominal state 402 to critical or soon-to-fail state 403, stochastic degradation transition 413 from critical or soon-to-fail state 404 to failed state 404, stochastic degradation transition 423 from new or recently maintained state 401 straight to critical or soon-to-fail state 403, stochastic degradation transition 424 from nominal state 402 straight to failed state 404, and stochastic degradation transition 434 straight from new or recently maintained state 401 to failed state 404. Dynamic asset fleet maintenance scheduling system 480 may implement software modeling of condition state transition model 400 in generating computing device predictions of these stochastic degradation transitions, using a CTMC with time homogeneity model or other models, and with input data from any of the sources mentioned above and herein, to form predictive models of each of the depicted condition state transitions, and thereby to generate stochastic degradation predictions, which dynamic asset fleet maintenance scheduling system 480 may then use in generating maintenance scheduling, in various examples. In contrast, transitions from any other state to the under-maintenance state 405 are results of asset fleet maintenance scheduling, that dynamic asset fleet maintenance scheduling system 480 generates, based on the stochastic degradation modeling that dynamic asset fleet maintenance scheduling system 480 performs, and the stochastic degradation predictions that dynamic asset fleet maintenance scheduling system 480 generates.

Dynamic asset fleet maintenance scheduling system 480 may thus implement software modeling of condition state transition model 400 to use condition state transition model 400 to derive critical health thresholds of assets at critical or soon-to-fail state 403 and degrading toward critical or soon-to-fail state 403 and to estimate the time to critical or soon-to-fail state 403 from any or all of prior states 401 and 402. Dynamic asset fleet maintenance scheduling system 480 may further use condition state transition model 400 to determine maintenance plans to implement planned transitions of assets from nominal state 402 to under-maintenance state 405, and thereby to new or recently maintained state 401 (specifically, recently maintained), prior to the assets transitioning to critical or soon-to-fail state 403 or failed state 404.

Dynamic asset fleet maintenance scheduling system 200 may determine to reschedule a pre-planned maintenance of a particular asset, dependent on the time at which the particular asset transitions to a critical state with respect to the predicted or expected time at which it was expected to transition to that state, and the time at which maintenance for the particular asset had been pre-scheduled. The operating mode of the system may be defined by that of each individual asset: operational, failed, or under preventive maintenance (PM)/in a maintenance state.

Dynamic asset fleet maintenance scheduling system 200 may formulate a dynamic optimization model as a mixed-integer linear program that determines an optimal maintenance schedule for the rest of a planning time horizon. On the other hand, dynamic asset fleet maintenance scheduling system 200 may only implement a maintenance schedule for a short-term upcoming time period at a time. This optimization model may enable operators to control power usage in real-time using demand-side management strategies. Dynamic asset fleet maintenance scheduling system 200 may dynamically optimize among a multi-objective function to aim to minimize the sum of three terms for each time period (e.g., each upcoming discrete maintenance scheduling period): (1) cost due to loss of power in the network, (2) cost due to corrective maintenance (CM) upon asset failure, and (3) cost due to preventive maintenance (PM).

In some examples, dynamic asset fleet maintenance scheduling system 200 may adhere to two constraints to ensure that a number of assets under either CM and/or PM in any given period is less than a selected number. Given the stochastic degradation behavior of assets, these constraints may be posed as chance constraints and may be suitably linearized. Dynamic asset fleet maintenance scheduling system 200 may model assuming that power generated is equal to demand (no load shedding), in some examples. Dynamic asset fleet maintenance scheduling system 200 may model transmission line flow capacity and optimal power flow constraints. Dynamic asset fleet maintenance scheduling system 200 may implement an exact algorithm (e.g., a Benders decomposition-based procedure) to solve the optimization model. Using these example techniques, asset management decision modeling module 530 may derive the critical health threshold of each infrastructure asset, and estimate or predict the time to a critical health threshold state for each asset, and may combine and compare such prediction values for each asset to calculate and determine an overall optimized maintenance plan for the entire group of infrastructure assets, in context of available infrastructure asset maintenance resources, thereby generating a maintenance plan for each asset, to optimize maintenance of each asset prior to or in context of its predictions for approaching a critical health threshold state, in various examples. Dynamic asset fleet maintenance scheduling system 200 may thus solve an optimization model of the stochastic degradation prediction of the group state of the plurality of assets, costs of corrective maintenance for assets in a failed state, and costs of scheduled maintenance for the assets, using a Benders decomposition solution algorithm, and generate a maintenance schedule is based in part on the solved optimization model, in various examples.

Figure 5:
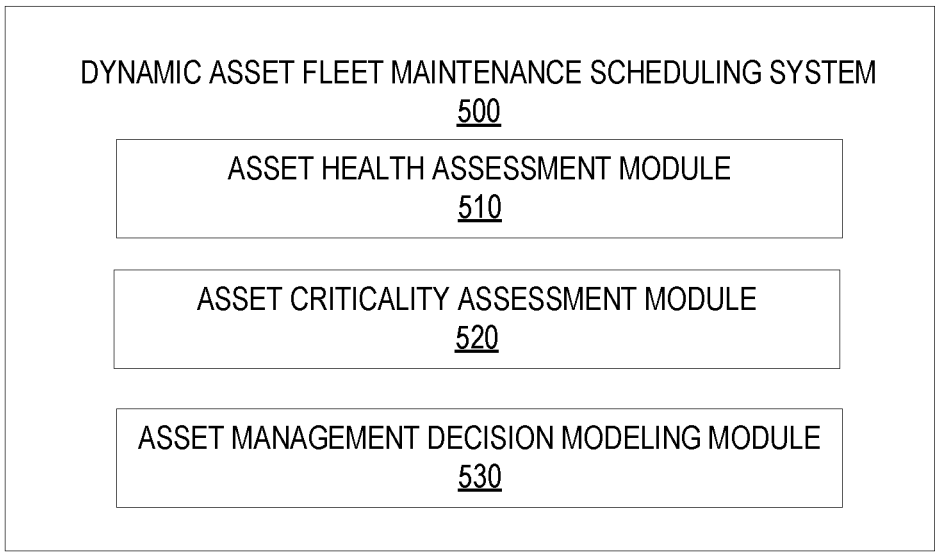
FIG. 5 depicts an example dynamic asset fleet maintenance scheduling system in a high-level system architecture, in accordance with various examples of this disclosure.

FIG. 5 depicts an example dynamic asset fleet maintenance scheduling system 500 in a high-level system architecture, in accordance with various examples of this disclosure. Examples of dynamic asset fleet maintenance scheduling system 500 of FIG. 5 may coincide with or overlap example implementations of dynamic asset fleet maintenance scheduling systems 200 and/or 480 of FIGS. 1, 2, and 4, in ways that are apparent from the description herein. Dynamic asset fleet maintenance scheduling system 500 may comprise an asset health assessment module 510, an asset criticality assessment module 520, and an asset management decision modeling module 530. As one example of overlap, asset management decision modeling module 530 as in FIG. 5 may comprise or otherwise overlap with schedule generating module 215 as in FIG. 2, in various embodiments.

Asset health assessment module 510 may receive, as inputs, for a given asset: original equipment manufacturer (OEM) specifications, performance baselines, temporal monitoring data, weather data for historical weather ambient to the asset, age, historical operating conditions. Asset health assessment module 510 may process inputs such as these and generate outputs such as a temporal health state trajectory (states and transition probabilities) for the given asset.

Asset criticality assessment module 520 may receive, as inputs, for a given asset: a condition state transition model 400 as in FIG. 4 (e.g., a digital data structure conforming to the conceptual diagram as depicted in condition state transition model 400 in FIG. 4) for the given asset; data on past failure history of the asset; temporal monitoring data; servicing history for the asset; network topology applicable to the asset; and historical operating conditions of the asset and similar assets belonging to the asset class, comparative information on total costs and burdens of corrective maintenance versus preventive maintenance, information on costs and burdens from loss of power associated with the given asset being out of the operating state, and regulatory data, for example. Asset criticality assessment module 520 may process inputs such as these and generate outputs such as real-time failure ("P"), predicted time to failure ("E") in the absence of preventive maintenance, and expected number of failures, for example, for the given asset.

Asset management decision modeling module 530 may receive, as inputs, for a given asset: real-time failure ("P") and predicted time to failure in the absence of preventive maintenance ("E") (e.g., as generated by asset criticality assessment module 520, operational constraints, maintenance constraints, objective to be optimized, power demand/loading data, and pricing data, for example. Asset management decision modeling module 530 may process inputs such as these and generate outputs such as a maintenance scheduling plan/a maintenance schedule for the given asset, a repair and/or replacement plan for the given asset, a risk management plan for the given asset, and/or a what-if analysis for the given asset, for example. Asset management decision modeling module 530 may combine the maintenance schedules of the assets in view of available maintenance resources and generate and output an optimized combined maintenance schedule for all of the assets, and output the entirety or suitable portions of that maintenance schedule to one or more asset maintenance operator devices, with directions for the infrastructure maintenance operators to use the available maintenance resources to carry out the indicated scheduled infrastructure asset maintenance tasks in accordance with the optimized schedule. Asset management decision modeling module 530 may thus enable unforeseen and inventive benefits in complex infrastructure asset maintenance management, which may unlock substantial and previously impossible novel benefits in terms of infrastructure asset uptime, cost efficiency of maintenance, and other inventive advantages, in various examples of this disclosure.

Dynamic asset fleet maintenance scheduling system 500 may model asset health transitions are modeled as a Markov decision process, e.g., a continuous time Markov chain (CTMC) with time homogeneity, as noted above with reference to FIG. 4. Referring further again to FIG. 4, dynamic asset fleet maintenance scheduling system 500 may receive temporal asset health data as inputs, and identify discrete states of operation 1, 2, ..., N (as in FIG. 4) where 1, 2, ..., N−1 are states where the asset is operational and N is the state corresponding to its failure; and may extract transition rates, $\lambda_k^{ij}$ between states i and j. Dynamic asset fleet maintenance scheduling system 500 may develop the state transition diagram and transition rates for each asset class of a plurality of asset classes. 1 corresponds to a "new" state (new or repaired asset). N corresponds to failure state. Dynamic asset fleet maintenance scheduling system 500 may identify a critical health threshold state TH for each class, based on inputs such as structured and unstructured data, and subject matter expert (SME) feedback, for example. Dynamic asset fleet maintenance scheduling system 500 may determine transition probabilities between states based at least in part on asset health data.

Figure 6:
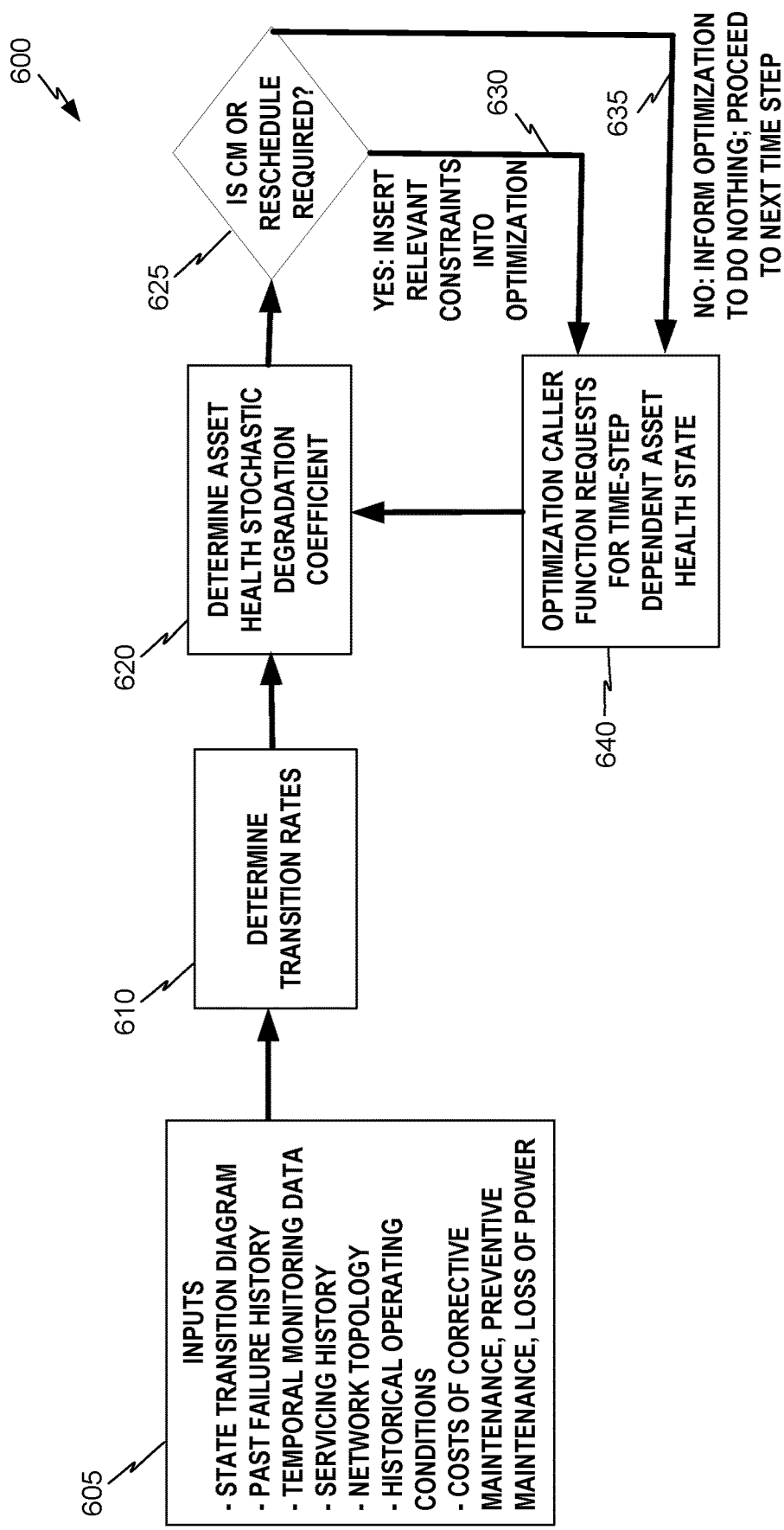
FIG. 6 depicts a flowchart for an example method that an asset criticality assessment module may perform to assess criticality of assets and generate predictions of assets approaching their critical health threshold, in accordance with various examples of this disclosure.

FIG. 6 depicts a flowchart for an example method 600 that an asset criticality assessment module 520 may perform to assess criticality of assets and generate predictions of assets approaching their critical health threshold, in accordance with various examples of this disclosure. Asset criticality assessment module 520 may collect inputs (605), such as a condition state transition diagram, past failure history, temporal monitoring data, servicing history, network topology, historical operating conditions, corrective maintenance (CM) vs. preventive maintenance (PM), and costs from loss of power, for example. Asset criticality assessment module 520 may determine condition state transition rates for assets (610). Asset criticality assessment module 520 may determine a health degradation coefficient (620). Asset criticality assessment module 520 may assess whether corrective maintenance (CM) or reschedule is required (625). If asset criticality assessment module 520 determines that, yes, corrective maintenance or reschedule is required, asset criticality assessment module 520 may insert the corresponding relevant constraints into an optimization (630), where the optimization may comprise another software module and/or data structure hosted by dynamic asset fleet maintenance scheduling system 500, for example. If asset criticality assessment module 520 determines that, no, corrective maintenance or reschedule is not required, asset criticality assessment module 520 may inform the optimization to do nothing at that time, and instead proceed to the next time step (635). An optimization caller function may then request for time-step dependent asset health state (640), and asset criticality assessment module 520 may return to and update determining a health degradation coefficient (620).

Example techniques of determining condition transition rates for assets (610) are described as follows. Let us define the state space of an asset k to be $S_k$. Let $p_{ijt}^k$ be the probability that an asset k transitions from state i to j at time t, and $X_k^t$ be a random variable denoting the state of asset k at time t. Then, by definition, $p_k^{ijt} = P\{X_k^{(t+s)} = j | X_k^s = i\}$, $\forall i, j \in S_k$, $s, t > 0$. It follows from the assumption of time homogeneity that $p_{ijt}^k$ is independent of time instant s. In CTMS, the state of the system at time s makes no reference to the amount of time that the state has been occupied. Therefore, the probability is independent of the amount of time state i has been occupied. Due to this memoryless property, time until a transition from state i may be exponentially distributed. This implies that the time spent in state i is exponentially distributed.

By the Chapman-Kolmogorov equation for CTMC, $$P(s+u) = P(s)P(u)$$

$$\forall s, u \geq 0 \tag{Equation 1}$$

It follows that P(0)=I, which means that if no time passes, no transition occurs. Infinitesimal generator matrix, Q, is defined as the derivative of P(u) at u=0.

$$Q = \lim_{u \to 0^+} \frac{P(u) - I}{u} \tag{Equation 2}$$

The off diagonal elements in Q are the transition rates $\lambda^{ij}$, $\forall i, j \in S$. Since row sums are zero, the diagonal elements in Q are $\lambda^{ii} = -\sum_{j \neq i} \lambda^{ij}$. Additionally, it can be shown that $$\frac{dP(u)}{dt} = QP(t).$$

By this mechanism, once transition rates are computed from data, the corresponding transition probabilities may be suitably derived.

Example techniques by which dynamic asset fleet maintenance scheduling system 500 may model asset health degradation are described as follows. Here, a system of this disclosure may consider assets that may be pre-scheduled for maintenance. An asset failure may occur in one of these three scenarios.

In case 1, an asset has the following observed and predicted sequence of events in the following order: earliest maintenance start; enter critical state; scheduled maintenance; expected time of failure if not maintained. In this sequence, dynamic asset fleet maintenance scheduling system 500 may issue a recommendation to do nothing. The scheduled maintenance will prevent the asset from failing.

In case 2, an asset has the following sequence of events in the following order: earliest maintenance start; enter critical state; unexpected asset failure; scheduled maintenance. In this sequence, dynamic asset fleet maintenance scheduling system 500 may issue a recommendation to perform corrective maintenance.

In case 3, an asset has the following sequence of events in the following order: enter critical state; earliest maintenance start; scheduled maintenance; asset failure. In this sequence, dynamic asset fleet maintenance scheduling system 500 may issue a recommendation to reschedule maintenance.

Dynamic asset fleet maintenance scheduling system 500 may further model asset health stochastic degradation and determine asset health stochastic degradation coefficients (620 in FIG. 6), and generate stochastic degradation predictions, to enable generating asset maintenance scheduling, as follows. Let $\tau_k^{ij}$ be a random variable denoting the time at which asset k transitions from state i to j. Let $T_k^{HT}$ be the time at which asset k reached the critical health degradation or critical health threshold state, and let $T_k^{PM}$ be the time at which preventive maintenance is prescheduled for asset k. At each time step of the planning horizon, dynamic asset fleet maintenance scheduling system 500 may determine whether changes in asset health occur at a higher rate than the expected degradation rate. If necessary, dynamic asset fleet maintenance scheduling system 500 may trigger a rescheduling procedure. Dynamic asset fleet maintenance scheduling system 500 may apply this modeling in the three cases above as follows:

Case 1: $\tau_k^{i,HT} > T_k^{HT}$ and $\tau_k^{i,N} > T_k^{PM}$. This implies that asset k has not reached the critical health threshold HT before $T_k^{HT}$ and undergoes PM before reaching the failure state, N. Let $\mathcal{F}_k^{i,HT,t}$ be the CDF of $\tau_k^{i,HT}$, that is, $\mathcal{F}_k^{i,HT,t} = P(\tau_k^{i,HT} \leq t)$. Let $\mathcal{F}_k^{i,N,t}$ be the CDF of $\tau_k^{i,N}$, that is, $\mathcal{F}_k^{i,N,t} = P(\tau_k^{i,N} \leq t)$. Then, the probability of this case occurring can be expressed as:

$$\pi_k^1 = \left(1 - \mathcal{F}_k^{i,HT,T_k^{HT}}\right)\left(1 - \mathcal{F}_k^{i,N,T_k^{PM}}\right) \quad \text{(Equation 4)}$$

Case 2: $\tau_k^{i,HT} > \tau_k^{HT}$ and $\tau_k^{i,N} < T_k^{PM}$. This implies that asset k has not reached the critical health threshold HT before $T_k^{HT}$ but it suddenly fails in $[T_k^{HT}, T_k^{PM}]$. Then, the probability of this case occurring can be expressed as:

$$\pi_k^2 = \left(1 - \mathcal{F}_k^{i,HT,T_k^{HT}}\right)\mathcal{F}_k^{i,N,T_k^{PM}} \quad \text{(Equation 5)}$$

Case 3: $\tau_k^{i,HT} < T_k^{HT} < T_k^{PM}$. This implies that asset k has not reached the critical health threshold HT before $T_k^{Tm}$ and its planned maintenance would need to be rescheduled to occur at $\tau_k^{i,HT}$. Then, the probability of this case occurring can be expressed as:

$$\pi_k^3 = \mathcal{F}_k^{i,HT,T_k^{HT}} \quad \text{(Equation 6)}$$

Dynamic asset fleet maintenance scheduling system 500 may perform optimization modeling with an objective function, as illustratively follows, as part of deriving the critical health thresholds for assets and estimating and predicting the time to critical health threshold states for each asset in the infrastructure, and using those prediction values to calculate and determine maintenance plans for each asset and for the whole group of assets in the infrastructure.

A system of this disclosure may consider the problem of scheduling preventive maintenance for a set of spatially distributed assets, K, in an electricity distribution network over a set of discrete time periods, T. In each time period t, an asset may be in one of three operating modes: operational, failed, or under preventive maintenance. Let L be the operating modes of the system. Let $p^{lt}$ denote the probability that the system is in mode $l \in L$ at time t. A system of this disclosure may further model an infrastructure context based on an assumption that the operator is able to monitor and control power usage in real-time using demand-side management strategies, such that power generated is equal to power demand, such that generating the maintenance schedule is based in part on this modeled infrastructure context. Let $\beta_k^{lt}$ be a decision variable denoting the operator instituted reduction in power (as may be measured in kilowatt-hours (kWh)) transmitted by asset k at time t while operating in mode l. The loss of power in the network at time t, denoted by $I_t$, is:

$$I_t = \sum_{l \in \mathcal{L}} \sum_{k \in K} p^{lt} \beta_k^{lt} \quad \text{(Equation 7)}$$

Then, the cost due to this loss of power is simply $\Sigma_{t \in T} I_t C^O$, where $C^O$ is the outage cost per kWh. Additionally, an electricity distribution and transmission company may also incur a cost from CM due to asset failure, and cost due to preventive maintenance (PM). The expected cost due to CM may be expressed as the product of the failure risk for each asset k in [0,t], $R_{kt}$, and the cost to perform CM on the asset, $C_k^{CM}$. Let $y_{kt}$ be a decision variable that equals 1 if asset k is undergoing PM in $t \in T$. Then, the cost due to PM may be expressed as $\Sigma_{k \in K} \Sigma_{t \in T} y_{kt} C_k^{PM}$, where $C_k^{PM}$ is the cost to perform PM on an asset. Adding up these costs, the objective function for maintenance scheduling optimization may be written as:

$$\min_{T_k^{PM}, \beta_k^{lk}} \sum_{t \in \mathcal{T}} I_t C^O + \sum_{k \in K} \sum_{t \in \mathcal{T}} R_{kt} C_k^{CM} + \sum_{k \in K} \sum_{t \in \mathcal{T}} y_{kt} C_k^{PM} \quad \text{(Equation 8)}$$

Dynamic asset fleet maintenance scheduling system 500 may determine system state probabilities as illustratively follows. The probability of the system being in one of the three operational modes can be expressed as:

$$p^{it} = \prod_k P(k \text{ is operational at } t \in \mathcal{T}) \quad \text{(Equation 9)}$$

$$\prod_k P(k \text{ has failed and is undergoing } CM \text{ in } t \in \mathcal{T})$$

$$\prod_k P(k \text{ is undergoing } PM \text{ } t \in \mathcal{T})$$

where $$P(k \text{ is operational at } t \in \mathcal{T}) = \alpha_k^{it} \quad \text{(Equation 10)}$$

$$P(k \text{ is undergoing } CM \text{ in } t \in \mathcal{T}) = 1 - \alpha_j^{it} - \frac{d(F_k^{i,HT,t})}{dt}$$

-continued if $t \in [0, T_k^{HT}) = 1 - \alpha_k^{it}$ if $t \in [T_k^{HT}, T_k^{PM}] = 1 - \alpha_k^{it} - \pi_k^1$ if $t \in [T_k^{PM}, T_k^{PM} + d_k^{CM}) = 1 - \alpha_k^{it}$ if $t \in [T_k^{PM} + d_k^{CM}, T]$ $$P(k \text{ is undergoing } PM \text{ in } t \in \mathcal{T}) = \frac{d(F_k^{i,HT,t})}{dt} \quad \text{(Equation 11)}$$

if $t \in [0, T_k^{HT}) = \pi_k^1$ if $t \in [T_k^{PM}, T_k^{PM} + d_k^{PM})$ (Equation 12)

where $d_k^{CM}$ is the duration of performing CM on asset k and $d_k^{PM}$ is the duration of performing PM on asset k.

In the second term of Equation 8, the failure risk, $R_{kt}$ can be computed as the sum of the expected number of failures in [0,t] under each case of Equations 4 through 6 multiplied by the probability of each case occurring. That is, $$R_{kT} = E[\Gamma_{kT} | \tau_k^{i,HT} > T_k^{HT}, \tau_k^{i,N} > T_k^{PM}]\pi_k^1 + \quad \text{(Equation 13)}$$
$$E[\Gamma_{kT} | \tau_k^{i,HT} > T_k^{HT}, \tau_k^{i,N} \leq T_k^{PM}]\pi_k^2 +$$
$$E[\Gamma_{kT} | \tau_k^{i,HT} \leq T_k^{HT} \leq T_k^{PM}]\pi_k^3$$

Dynamic asset fleet maintenance scheduling system 500 may incorporate optimization modeling constraints as illustratively follows. Decision variable $R_{kt}$ may be defined to equal 1 when asset k becomes unavailable in t∈ T. Let $\eta_{kt}$ be a random variable that is equal to 1 if $\bar{t} > \tau_k^{i,N}$, and 0 otherwise. A chance constraint may ensure that the number of assets under CM is less than a predefined threshold $\rho$ with probability $1-\epsilon$.

$$Pr(\sum_{k \in K} \sum_{t \in \mathcal{T}} \eta_{kt} e_{kt} \leq \rho) \geq 1 - \epsilon \quad \text{(Equation 14)}$$

Let $f_{kt}$ be equal to 1 when asset k becomes available in t∈ T. Then, by definition, $y_{kt} - y_{k,t-1} = e_{kt} - f_{kt}, \forall k \in K, t \in \mathcal{T}$ (Equations 15a, 15b, 15c, 15d)

$c_{kt} + f_{kt} \leq 1, \forall k \in K, t \in \mathcal{T}$ $\sum_{k \in K} e_{k,1} = \sum_{k \in K} f_{k,1} = 0, \forall k \in K$ $y_{kt} + y_{k,t+1} + \ldots + y_{k,t+d_k^{PM}} \leq d_k^{PM}, \forall k \in K, t \in \{1, \ldots, T - d_k^{PM}\}$ Let $\Gamma^{PM}$ be the upper bound on the number of PM that can be scheduled simultaneously in a given time period and $\bar{C}^{PM}$ be the upper bound on the cost of PM. Then, $\sum_{k \in K} y_{kt} \leq \Gamma^{PM}, \forall i \in \mathcal{T}$ (Equations 16, 17, 18, 19)

$\sum_{k \in K} \sum_{p \in \{1,2,3\}} \pi_k^p C_k^{PM} \leq \bar{C}^{PM}$

-continued $T_k^{PM} = te_{kt} + M(1 - e_{kt}), \forall k \in K, t \in \mathcal{T}, M \gg \mathcal{T}$ $0 \leq T_k^{HT} \leq T_k^{PM}, 1 \leq T_k^{PM} \leq T, \forall k \in K$ In the generation and distribution network, a system of this disclosure may model an infrastructure context based on an assumption that the power generated is equal to the power demand. A system of this disclosure may perform modeling based on an assumption that there is no load shedding. This is captured by constraint (20a). Let $A_{m,t}$ be the admittance matrix. Then the transmission line flow capacity constraint is enforced by constraints (20b). A system of this disclosure may thus model transmission line flow capacity and power flow constraints, such that generating the maintenance schedule is further based on the modeled transmission line flow capacity and power flow constraints. Constraints (20a)-(20d) are derived from the optimal power flow constraints.

$$\sum_{k \in K} P_{k,m,t}^d - P_{k,m,i}^g = 0, \forall t \in \mathcal{T}, m \in M \quad \text{(Equations 20a, 20b, 20c, 20d)}$$

$$P_{m,t,a}^f = \mathcal{A}_{m,t}(P_{k,m,t}^g - P_{k,m,t}^d), \forall t \in \mathcal{T}, m \in M, a \in A$$

$$-\bar{P}_{m,a}^f \leq P_{m,t,a}^f \leq \bar{P}_{m,a}^j, \forall t \in \mathcal{T}, m \in M, a \in A$$

$$0 \leq P_{k,m,t}^g \leq \bar{P}_k^g, \forall t \in \mathcal{T}, m \in M, a \in A$$

Dynamic asset fleet maintenance scheduling system 500 may perform linearization of constraint for limit on a maximum number of corrective maintenance jobs, as illustratively follows.

Using Markov's inequality, constraint (14) may be rewritten as $$P(\sum_{k \in K} \sum_{t \in \mathcal{T}} \eta_{kt} e_{kt} \geq \rho) \leq \frac{E[\sum_{k \in K} \sum_{t \in \mathcal{T}} \eta_{kt} e_{kt}]}{\rho} = \quad \text{(Equation 21)}$$

$$\frac{\sum_{k \in K} \sum_{t \in \mathcal{T}} E[\eta_{kt}] e_{kt}}{\rho} \leq \epsilon$$

Let $G_k(e) = \sum_{t \in \mathcal{T}} \eta_{kt} e_{kt}$ be a random variable representing a maintenance action e on asset k. Since $\sum_{k \in K} e_{kt} = 1$, $G_k(e)$ is a Bernoulli random variable that equals 1 with a probability $p_k(e)$ and 0 otherwise. Hence, $P(\sum_{k \in K} \sum_{t \in \mathcal{T}} \eta_{kt} e_{kt} \geq \rho)$ may be rewritten as $P(\sum_{k \in K} G_k(e) \geq \rho)$. Given maintenance decision e, $G_k(e)$ for each asset class is i.i.d.

$$P\left(\sum_{k \in K} G_k(e) \geq \rho\right) = P(e^{\alpha \sum_{k \in K} G_k(e)} \geq e^{\alpha \rho}) \leq \frac{E[e^{\alpha \sum_{k \in K} G_k(e)}]}{e^{\alpha \rho}} = \quad \text{(Equation 22)}$$

$$\frac{E[\prod_{k \in K} e^{\alpha G_k(e)}]}{e^{\alpha \rho}} = \prod_{k \in K} \frac{E[e^{\alpha G_k(e)}]}{e^{\alpha \rho}} =$$

$$\frac{\prod_{k \in K} [p_k(e) e^{\alpha} + 1 - p_k(e)]}{e^{\alpha \rho}} \leq \frac{[p(e) e^{\alpha} + 1 - p(e)]}{e^{\alpha \rho}} \leq \epsilon$$

where $$p(e) = \frac{\sum_{k \in \mathcal{K}} p_k(e)}{|\mathcal{K}|} = \frac{\sum_{k \in K} \sum_{t \in \mathcal{T}} P(t \geq \tau_k) e_{k,t}}{|\mathcal{K}|}.$$

This gives the following constraint:

$$\sum_{k \in K} \sum_{t \in \mathcal{T}} P(t \geq \tau_k) e_{kt} \leq \frac{((\epsilon e^{\alpha p})^{\frac{1}{|K|}} - 1)|K|}{e^\alpha - 1} \quad \text{(Equation 23)}$$

Since $E[\eta_{kt}] = P(t \geq \tau_k)$, a system of this disclosure may thereby obtain the desired bound. The inequality in Equation 23 provides a safe approximation for chance constraint in Equation 14 for any positive $\alpha$.

Dynamic asset fleet maintenance scheduling system 500 may perform solution approach as illustratively follows. The optimization formulation may be decomposed into a master problem and a subproblem, wherein solving the master problem solves the dynamic scheduling problem, and solving the subproblem addresses the power network generation (modeled as a capacitated network flow problem) and demand fulfillment optimization.

Because the flow through the network at each time $t \in T$ is independent of the flow at other times, the problem may be further broken up by disaggregating the subproblems in t, so a system of this disclosure may solve one subproblem for each time period. The relaxed master problem is a MILP whereas the subproblem is an LP and, thus, both can be solved by CPLEX.

The relaxed master problem (RMP) may be expressed as:

$$\min_{T_k^{PM}, T_k^{HT}} \sum_{k \in K} R_{kt} C_k^{CM} + \sum_{k \in K} \sum_{t \in \mathcal{T}} y_{kt} C_k^{PM} + \Lambda(T_k^{PM}, T_k^{HT})$$

The subproblem (SP) may be expressed as:

$$\Lambda(T_k^{PM}, T_k^{HT}) = \min_{P_{k,m,t}^g, P_{m,t,a}^f} \sum_{t \in \mathcal{T}} I_t C^O$$

subject to 20(a) through 20(d).

Dynamic asset fleet maintenance scheduling system 500 may perform a solution algorithm based on a Benders decomposition, in various examples, comprising performing the following:

1. In each time period t obtain an optimal solution to the RMP for the next time period t+1.
2. For each scenario (asset maintenance plan for t+1), solve SP and obtain the dual variables associated with constraint (20). These will provide an estimate of the impact of asset availability on the transmission flow on each edge in the network, which will allow us to add Benders cuts to the RMP.
3. Let $d_{at}$ be the dual variable associated with constraint (20). Then, the objective of the dual problem will be $$\min_{d_{at}} A_{mt}(P_{kmt}^g - P_{kmt}^d) d_{at}.$$

4. Approximate the solutions to the SP with new variables in the RMP, $\Lambda t$. For each $t \in T$, a valid UB on the objective of the dual problem is: $\Lambda_t \leq \Sigma_{a \in A} A_{mt}(P_{kmt}^g - P_{kmt}^d) d_{at} \; \forall k \in K, m \in M, t \in T$.
5. If for each scenario, the corresponding subproblem is feasible, and all the constraints are satisfied, optimal solution is found for the MP. Terminate algorithm.
6. If subproblem corresponding to some scenario has an optimal solution with cost >MP*, an optimal basic feasible solution to the dual of the subproblem is identified and add constraint: $\Lambda_t \leq \Sigma_{a \in A} A_{mt}(P_{kmt}^g - P_{kmt}^d) d_{at} \; \forall k \in K, m \in M, t \in T$ to the RMP.
7. If the subproblem corresponding to a scenario is infeasible, its dual has a finite cost and a positive cost extreme ray, $w^j$ is identified and added to the RMP.
8. Additional cuts added iteratively to the RMP include hard constraints on maintenance for a subset of the assets.

In these aspects described above, dynamic asset fleet maintenance scheduling system 500 may thus further model asset health stochastic degradation and determine asset health stochastic degradation coefficients, and generate stochastic degradation predictions, to enable generating asset maintenance scheduling, in various examples. Further aspects of dynamic asset fleet maintenance scheduling systems of this disclosure modeling asset health stochastic degradation and determine asset health stochastic degradation coefficients and generating stochastic degradation predictions and generating asset maintenance scheduling are further described as follows.

Figure 7:
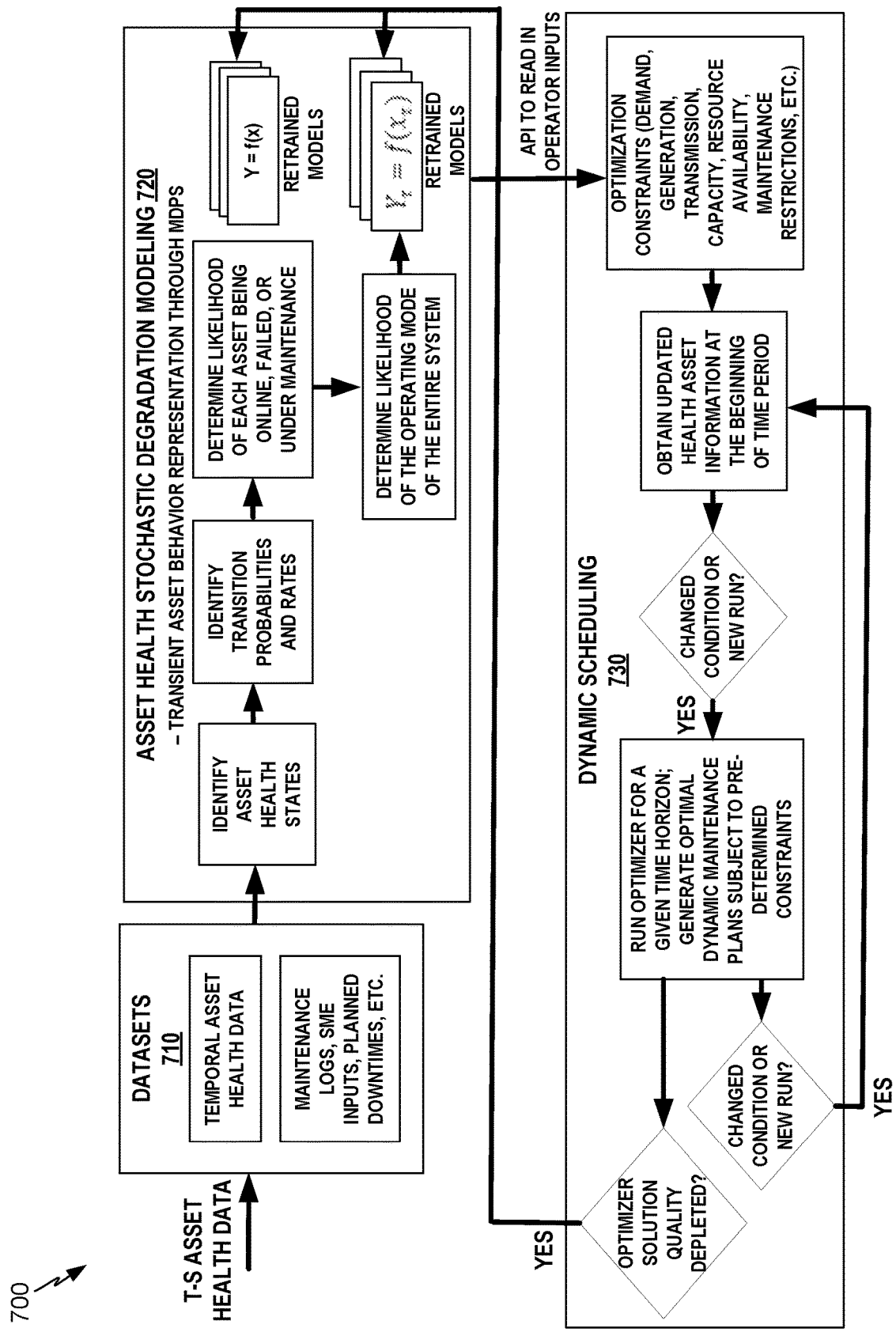
FIG. 7 depicts an example system architecture for a dynamic asset fleet maintenance scheduling system, in accordance with various examples of this disclosure.

FIG. 7 depicts an example system architecture for a dynamic asset fleet maintenance scheduling system 700, in accordance with various examples of this disclosure, which may have overlap with other examples described herein. Dynamic asset fleet maintenance scheduling system 700 includes a health asset stochastic degradation modeling module 720 and a dynamic scheduling module 730. Health asset stochastic degradation modeling module 720 may be analogous to and/or have functional overlap with model generating module 211 and/or prediction generating module 213 of FIG. 2, and/or with condition state transition model 400 that dynamic asset fleet maintenance scheduling system 480 implements, in various examples. Dynamic scheduling module 730 may be analogous to and/or have functional overlap with schedule generating module 215 of FIG. 2. Dynamic asset fleet maintenance scheduling system 700 receives data and assembles it into datasets 710, such as datasets of temporal asset health data, maintenance logs, SME inputs, planned downtimes, and so forth.

Health asset stochastic degradation modeling module 720 may receive datasets 710, identify asset health states, and identify transition probabilities and rates. Health asset stochastic degradation modeling module 720 may further determine likelihood of each asset being online, determine likelihood of the operating mode of the entire system, and train models.

Dynamic scheduling module 730 may comprise an application programming interface (API) to facilitate reading in operator inputs from health asset stochastic degradation modeling module 720. Dynamic scheduling module 730 may apply optimization constraints, e.g., electricity demand, electricity generation, capacity, resource availability, maintenance restrictions. Dynamic scheduling module 730 may obtain updated asset health information at the beginning of a time period. Dynamic scheduling module 730 may determine whether there is a changed condition or a new run. Dynamic scheduling module 730 may run an optimizer for a given time horizon, and generate optimal dynamic maintenance plans subject to predetermined constraints. Dynamic scheduling module 730 may again determine whether there is a changed condition or a new run. If dynamic scheduling module 730 determines that, yes, there is a changed condition or a new run, dynamic scheduling module 730 may return to obtaining updated asset health information at the beginning of a time period. Dynamic scheduling module 730 may also determine whether optimizer solution quality is depleted. If dynamic scheduling module 730 determines that optimizer solution quality is depleted, it may provide feedback to health asset stochastic degradation modeling module 720 for further retraining models.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
  generating, by one or more computing devices, a parametric model that expresses condition states for each of a plurality of assets, and a probability of the plurality of assets transitioning between the condition states, wherein the plurality of assets comprise distributed infrastructures;
  generating, by the one or more computing devices, stochastic degradation predictions of a first group of the plurality of assets, based on the condition states and the probability of transitioning between the condition states for at least one of the assets of the plurality of assets;
  generating, by the one or more computing devices, a maintenance schedule based on: the stochastic degradation predictions of the first group of the assets, costs of corrective maintenance for assets of the plurality of assets in a failed state, and costs of scheduled maintenance for the first group of assets; and
  outputting the generated maintenance schedule to one or more infrastructure maintenance operator devices, to control a usage of the at least one asset in real-time.

2. The method of claim 1, wherein generating the parametric model comprises modeling a stochastic degradation process of a selected asset among the plurality of assets.

3. The method of claim 1, wherein generating the parametric model comprises modeling a stochastic degradation process of a selected asset of the plurality of assets as a continuous time Markov chain (CTMC) with time homogeneity.

4. The method of claim 1, wherein generating the parametric model comprises creating a state transition model for a selected asset of the plurality of assets, and determining transition probabilities between condition states for the selected asset in the state transition model.

5. The method of claim 1, wherein generating the parametric model comprises determining a critical state for a selected asset of the plurality of assets.

6. The method of claim 5, wherein generating the parametric model further comprises determining an expected time for the selected asset to degrade to the critical state.

7. The method of claim 6, wherein determining the expected time for the selected asset to degrade to the critical state is performed based at least in part on historical data of the selected asset, of the selected asset's conditions over time, and of analogous assets and their conditions over time.

8. The method of claim 1, wherein the parametric model is based at least in part on historical asset health data.

9. The method of claim 1, wherein the condition states comprise at least a new or recently maintained state, an operational state, a critical or soon-to-fail state, a failed state, and an under-maintenance state.

10. The method of claim 1, wherein generating the maintenance schedule is further based at least in part on adhering to constraints to ensure that a number of assets under either corrective maintenance or preventive maintenance in a selected period of time is less than a selected number.

11. The method of claim 1, further comprising modeling an infrastructure context based on an assumption that power generated is equal to power demand, wherein generating the maintenance schedule is further based on the modeled infrastructure context.

12. The method of claim 1, further comprising modeling transmission line flow capacity and power flow constraints, wherein generating the maintenance schedule is further based on the modeled transmission line flow capacity and power flow constraints.

13. The method of claim 1, further comprising solving an optimization model of the stochastic degradation predictions of the group of assets, costs of corrective maintenance for assets in a failed state, and costs of scheduled maintenance for the assets, using a Benders decomposition solution algorithm, wherein generating the maintenance schedule is further based on the solved optimization model.

14. The method of claim 1, wherein generating the stochastic degradation predictions for a selected asset of the group of assets further comprises generating a predicted time to failure, in an absence of preventive maintenance, for the selected asset, based at least in part on one or more factors selected from a group consisting of: a condition state transition model for the selected asset; data on past failure history of the selected asset; temporal monitoring data of the selected asset; servicing history for the selected asset;

network topology applicable to the selected asset; and historical operating conditions for the selected asset.

15. The method of claim 1, wherein generating the maintenance schedule comprises generating a maintenance schedule for a selected asset of the plurality of assets, based at least in part on a predicted time to failure for the selected asset in the absence of preventive maintenance.

16. The method of claim 1, wherein the one or more infrastructure maintenance operator devices are associated with the one or more of an electrical power grid, a natural gas distribution grid, a municipal water supply system.

17. A computer program product comprising one or more computer readable storage media having program instructions collectively stored on the one or more computer readable storage media, the program instructions executable to:
   generate a parametric model that expresses condition states for each of a plurality of assets, and a probability of the plurality of assets transitioning between the condition states, wherein the plurality of assets comprise distributed infrastructure;
   generate stochastic degradation predictions of a first group of the plurality of assets, based on the condition states and the probability of transitioning between the condition states for at least one of the assets of the plurality of assets;
   generate a maintenance schedule based on: the stochastic degradation predictions of the first group of the assets, costs of corrective maintenance for assets of the plurality of assets in a failed state, and costs of scheduled maintenance for the first group of assets; and
   output the generated maintenance schedule to one or more infrastructure maintenance operator devices, to control a usage of the at least one asset in real-time.

18. The computer program product of claim 17, wherein generating the parametric model further comprises:
   modeling a stochastic degradation process of a selected asset among the plurality of assets as a continuous time Markov chain (CTMC) with time homogeneity;
   creating a state transition model for the selected asset;
   determining transition probabilities between condition states for the selected asset in the state transition model;
   determining a critical state for the selected asset of the plurality of assets; and
   determining an expected time for the selected asset to degrade to the critical state, based at least in part on historical data of the selected asset, of the selected asset's conditions over time, and of analogous assets and their conditions over time.

19. A system comprising:
   a processor set, one or more computer readable storage media, and program instructions collectively stored on the one or more computer readable storage media, the program instructions executable to:
   generate a parametric model that expresses condition states for each of a plurality of assets, and a probability of the plurality of assets transitioning between the condition states, wherein the plurality of assets comprise distributed infrastructures;
   generate stochastic degradation predictions of a first group of the plurality of assets, based on the condition states and the probability of transitioning between the condition states for at least one of the assets of the plurality of assets;
   generate a maintenance schedule based on: the stochastic degradation predictions of the first group of the assets, costs of corrective maintenance for assets of the plurality of assets in a failed state, and costs of scheduled maintenance for the first group of assets; and
   output the generated maintenance schedule to one or more infrastructure maintenance operator devices, to control a usage of the at least one asset in real-time.

20. The system of claim 19, wherein generating the parametric model further comprises:
   modeling a stochastic degradation process of a selected asset among the plurality of assets as a continuous time Markov chain (CTMC) with time homogeneity;
   creating a state transition model for the selected asset;
   determining transition probabilities between condition states for the selected asset in the state transition model;
   determining a critical state for the selected asset of the plurality of assets; and
   determining an expected time for the selected asset to degrade to the critical state, based at least in part on historical data of the asset, of the asset's conditions over time, and of analogous assets and their conditions over time.

* * * * *